US012091905B2

(12) United States Patent
Sant'Anna Martins et al.

(10) Patent No.: US 12,091,905 B2
(45) Date of Patent: Sep. 17, 2024

(54) HINGE WITH SOFT-CLOSE FOLLOWER

(71) Applicant: WHIRLPOOL CORPORATION, Benton Harbor, MI (US)

(72) Inventors: Eduardo Sant'Anna Martins, Joinville (BR); Thomas Ponick, Joinville (BR); Rodrigo Tamanini, Joinville (BR)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 607 days.

(21) Appl. No.: 17/342,788

(22) Filed: Jun. 9, 2021

(65) Prior Publication Data

US 2022/0396988 A1 Dec. 15, 2022

(51) Int. Cl.
*F24C 15/36* (2006.01)
*E05F 5/02* (2006.01)
*F24C 15/12* (2006.01)

(52) U.S. Cl.
CPC ................ *E05F 5/02* (2013.01); *F24C 15/12* (2013.01); *E05Y 2201/21* (2013.01); *E05Y 2201/232* (2013.01); *E05Y 2900/30* (2013.01)

(58) Field of Classification Search
CPC ........ E05F 5/02; F24C 15/12; E05Y 2201/21; E05Y 2201/232
USPC .......................................................... 126/220
See application file for complete search history.

(56) References Cited

U.S. PATENT DOCUMENTS 2,328,757 A 9/1943 Tinnerman
2,581,892 A 1/1952 White
3,059,632 A * 10/1962 Rogers .................... F24C 15/12 126/214 R
4,114,236 A * 9/1978 Vandervort ........ G03B 27/6228 220/829
4,914,781 A * 4/1990 Sokn ..................... E05D 11/082 16/280
RE33,554 E * 3/1991 Stewart ................. E05D 11/087 16/342
7,431,174 B2 * 10/2008 Thissen ..................... F25D 3/08 220/574.2
8,483,784 B2 * 7/2013 Griffin .................. H04M 1/022 455/90.3

(Continued)

FOREIGN PATENT DOCUMENTS

AT 315423 B 5/1974
DE 3526902 C1 4/1987

(Continued)

*Primary Examiner* — Avinash A Savani
(74) *Attorney, Agent, or Firm* — Brooks Kushman P.C.

(57) ABSTRACT

A top panel of an appliance defines an appliance profile. A hinge assembly coupled to the appliance and an appliance lid allows the lid to pivot relative to the appliance between a lowered position in which the appliance lid rests horizontally above the appliance and a raised position in which the appliance lid defines a non-horizontal plane away from the appliance allowing access to at least a portion of the appliance. The hinge assembly includes one or more snap fit portions to engage the appliance profile of the appliance, such that the appliance operates as a cam and the one or more snap fit portions operates as a follower when in contact with the cam, thereby slowing the descent of the lid from the raised position to the lowered position by travel of the follower along the cam.

20 Claims, 3 Drawing Sheets

(56) References Cited

U.S. PATENT DOCUMENTS

| | | | | |
|---|---|---|---|---|
| 8,911,036 | B2 * | 12/2014 | Elkasevic | E05F 5/08 312/328 |
| 9,055,857 | B2 * | 6/2015 | Hotz | A47L 15/4261 |
| 10,041,685 | B2 * | 8/2018 | Kim | F24C 15/023 |
| 11,181,282 | B2 * | 11/2021 | Bell | F24C 15/12 |
| 11,293,208 | B2 * | 4/2022 | Heimbach | E05D 3/02 |
| 2005/0081721 | A1 * | 4/2005 | Craycraft | A47J 37/0718 99/450 |
| 2010/0127606 | A1 * | 5/2010 | Collene | E05F 1/1292 16/68 |
| 2014/0210324 | A1 * | 7/2014 | Kilgore | A47B 77/08 312/294 |
| 2015/0300065 | A1 * | 10/2015 | Cooper | E05D 11/0054 16/250 |
| 2016/0338556 | A1 * | 11/2016 | Payziev | A47K 13/307 |
| 2021/0064098 | A1 * | 3/2021 | Xiao | H04B 1/3888 |

FOREIGN PATENT DOCUMENTS

| | | | |
|---|---|---|---|
| EP | 1988339 | A2 | 11/2008 |
| EP | 2950003 | A1 | 12/2015 |
| FR | 2633327 | A3 | 12/1989 |
| WO | 2018202281 | A1 | 11/2018 |
| WO | 2020126490 | A1 | 6/2020 |

* cited by examiner

HINGE WITH SOFT-CLOSE FOLLOWER

TECHNICAL FIELD

Aspects of the disclosure generally relate to a hinge with a soft-close cam follower, for example, for use in a soft-close appliance lid.

BACKGROUND

An appliance, such as a cooktop or an oven/cooktop combination unit, may have heating elements on its top face for use in the preparation of food. In some cooking appliances, a lid is provided to cover the heating elements when the cooking appliance is not being used. This lid may be attached to the cooking appliance by one or more hinges, allowing for the lid to be opened for cooking and closed to protect the heating elements. Other types of appliances may also have lids, such as vertical washing machines.

SUMMARY

In one or more illustrative examples, a soft-close lid assembly for an appliance is provided. The assembly includes an appliance profile and an appliance lid. A hinge assembly is coupled to the appliance and the appliance lid to allow the lid to pivot relative to the appliance between a lowered position in which the appliance lid rests horizontally above the appliance and a raised position in which the appliance lid defines a non-horizontal plane away from the appliance allowing access to at least a portion of the appliance. The hinge assembly includes one or more snap fit portions configured to engage a portion of the appliance, such that the appliance is configured to operate as a cam and the one or more snap fit portions are configured to operate as a follower when in contact with the cam, such that descent of the lid from the raised position to the lowered position is slowed by travel of the follower along the cam.

The hinge assembly may include a left hinge and a right hinge supporting respective sides of the appliance lid. The one or more snap fit portions may include at least one snap fit portion on each of the left and right hinges. The left and right hinges may be mirror images of one another. The left and right hinges may be formed of an injected molded polymer.

The top panel may include one or more heating elements, and the appliance lid may be sized to cover the one or more heating elements in the lowered position. The appliance lid includes a glass top.

The weight of the appliance lid may bias the one or more snap fit portions of the hinge assembly against the appliance profile. The hinge assembly may be coupled to the rear of the appliance to allow the lid to pivot relative to the rear of the appliance.

In one or more illustrative examples, a soft-close apparatus for an appliance includes a hinge for coupling to an appliance and an appliance lid to allow the appliance lid to pivot relative to the appliance, wherein the hinge includes one or more snap fit portions configured to engage an appliance profile of the appliance, such that the appliance is configured to operate as a cam and the one or more snap fit portions are configured to operate as a follower when in contact with the cam, thereby slowing the descent of the lid by travel of the follower along the cam.

The hinge may allow the appliance lid to pivot relative to the appliance between a lowered position in which the appliance lid rests horizontally above the appliance and a raised position in which the appliance lid defines a non-horizontal plane away from the appliance allowing access to at least a portion of the appliance.

Each of the snap fit portions may define a protrusion extending towards a side of a top panel of the appliance, the top panel defining an appliance profile against which the snap fit portions run in a controlled motion to brake rotational motion of the appliance lid against the profile of the top panel. The one or more snap fit portions may include a plurality of snap fit portions.

The apparatus may further include an appliance lid is sized to cover one or more heating elements when in the lowered position. The appliance lid may include a glass top. The weight of the appliance lid may bias the one or more snap fit portions of the hinge against the appliance profile.

The hinge may be formed of an injected molded polymer. The hinge is coupled to the rear of the appliance to allow the lid to pivot relative to the rear of the appliance. The hinge defines an aperture configured to receive a pin about which the hinge provides the appliance lid to pivot relative to the appliance. The hinge may define a lid support having a longitudinal groove for mounting of the appliance lid.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A hinge assembly may couple a cooking appliance and an appliance lid. In an example, the hinge assembly may include a first hinge at a left rear of the cooking appliance and a second hinge at the right rear of the cooking appliance. The hinge assembly may allow the lid to pivot relative to the cooking appliance between a lowered position, in which the appliance lid rests horizontally above the cooking appliance, and a raised position, in which the appliance lid defines a non-horizontal plane away from the cooking appliance allowing access to at least a portion of the heating surface of the cooking appliance.

If the appliance lid is released from above a certain angle while in the open position, the lid may uncontrollably descend onto the heating surface. This impact may damage the lid, the heating surface, or both. Some hinge designs include dampers or springs to slow the descent of the lid. However, such mechanisms add to part count and assembly time, thereby increasing appliance costs.

An improved soft-close hinge may utilize the cam-follower principle to delay the fall of the appliance lid. That is, the cooking appliance profile may be used as a cam and one or more snap fit of the hinge assembly may be used as a follower. The hinge assembly may include one or more snap fit portions configured to engage the profile of the cooking appliance, such that the cooking appliance is configured to operate as a cam and the one or more snap fit portions are configured to operate as a follower when in contact with the cam. In such an approach, the falling of the lid from the raised position to the lowered position is slowed by travel of the follower along the cam. As this approach is integral to the hinge assembly itself, it does not affect assembly of the cooking appliance and also avoids adding complexity to the cooking appliance when generating the soft close effect.

Figure 1:
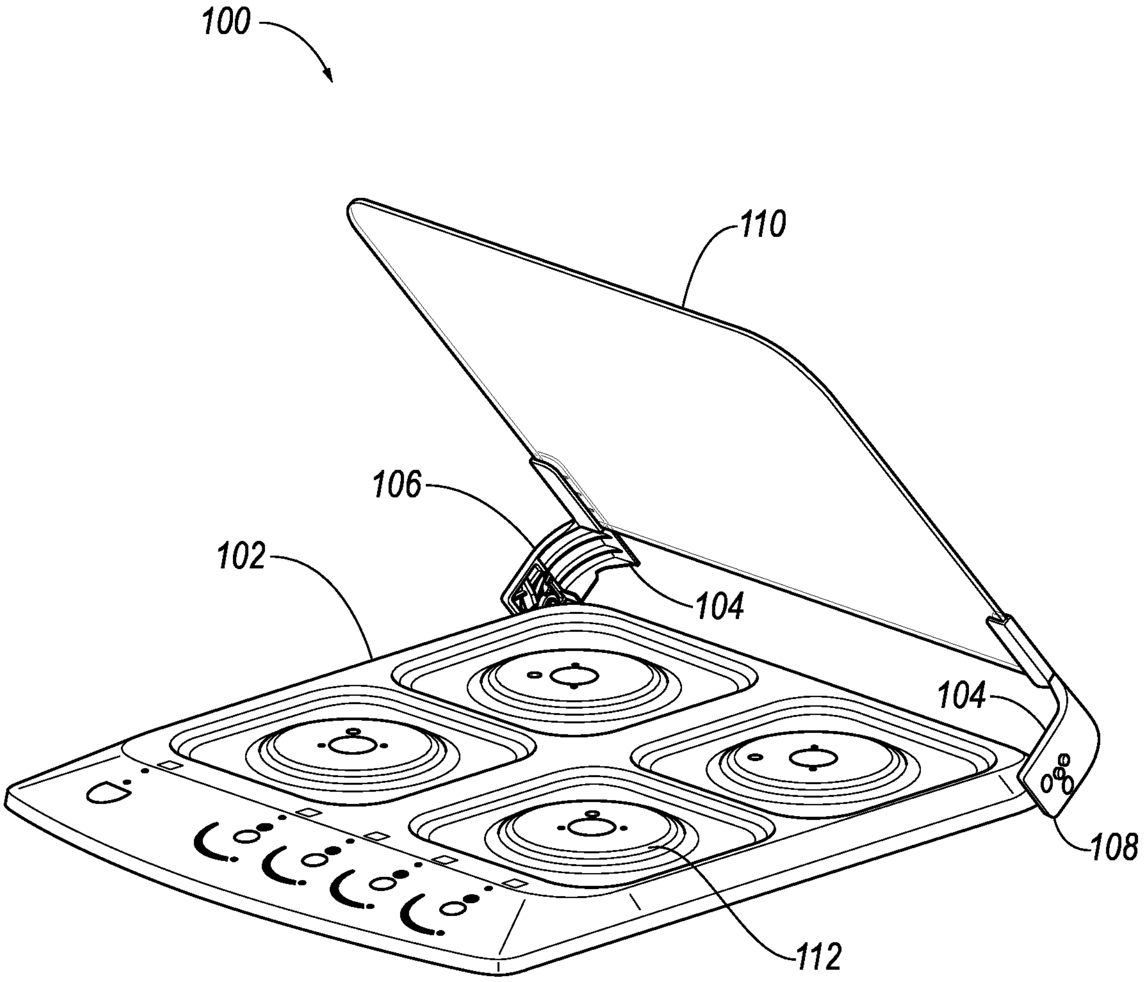
FIG. 1 is a perspective view of a cooking appliance, in accordance with an embodiment of the disclosure.

FIG. 1 is a perspective view of a cooking appliance 100 in accordance with an embodiment of the disclosure. As shown, the cooking appliance 100 includes a top panel 102 defining a cooking appliance 100 profile, a hinge assembly 104 including a left hinge 106 and a right hinge 108, and an appliance lid 110. The appliance lid 110 is attached to the rear of the top panel 102 and, in the illustrated example, is displayed in a partially open position.

The cooking appliance 100 may be any of various cooking appliances having one or more heating elements 112 on the top panel 102 for use in the preparation of food items. In an example, the cooking appliance 100 may be a standalone cooktop. In another example, the cooking appliance 100 may be a freestanding oven/cooktop combination unit.

The top panel 102 may define a top face to hold one or more heating elements 112 and a contour to a vertical flange extending downward about its periphery for securing the top panel 102 to the cooking appliance 100. The top panel 102 may also include cutouts for the mounting of knobs or other cooktop controls, as well as markings to explain the function of the controls.

The heating elements 112 may be of various designs. In an example, the top panel 102 may include a glass-ceramic cooktop, having radiant or inductive heating elements 112 installed beneath the smooth, easy to clean glass surface. In another example, the cooking appliance 100 may have a metal cooking, glass, or glass ceramic top panel 102 and the heating elements 112 may include one or more resistive coils that sit on top of top panel 102 of the cooking appliance 100 or in recessed cavities along the top panel 102 of the cooking appliance 100. In yet a further example, the heating elements 112 may include one or more gas burners along a metal or other flame-resistant material.

The appliance lid 110 may be provided to cover the heating elements 112 when the cooking appliance 100 is not being used. In an example, the appliance lid 110 may be composed of a strong heat-resistant material such as glass, silicon, metal, metal alloy, or synthetic material. The appliance lid 110 may allow customers to make use of the surface area above the cooktop during non-use, which may be especially beneficial in small spaces.

The hinge assembly 104 may allow the appliance lid 110 to pivot relative to the cooking appliance 100 between a lowered position, in which the appliance lid 110 rests horizontally above the heating elements 112 of the cooking appliance 100, and a raised position, in which the appliance lid 110 defines a non-horizontal plane away from the cooking appliance 100 allowing access to at least a portion of the heating elements 112 of the cooking appliance 100. In an example, in the raised position the appliance lid 110 may be vertical or nearly vertical, at approximately a right angle to the top panel 102 of the cooking appliance 100. As shown, the appliance lid 110 is at an intermediate partially open position between the lowered position and the raised position.

In many examples, the pivot point of the hinge assembly 104 may be along the rear top edge of the top panel 102. However, it should be noted that this is but one example, and appliance lids 110 may be pivotable from other cooktop locations, such as from a left or right side, or two half-size appliance lids 110, one on each of the left or right sides. Moreover, while many examples herein relate to a cooking appliance, it should also be noted that the described hinge assembly 104 may be applicable to other types of appliance as well, such as a clothes washing machine with an appliance lid 110.

Figure 2:
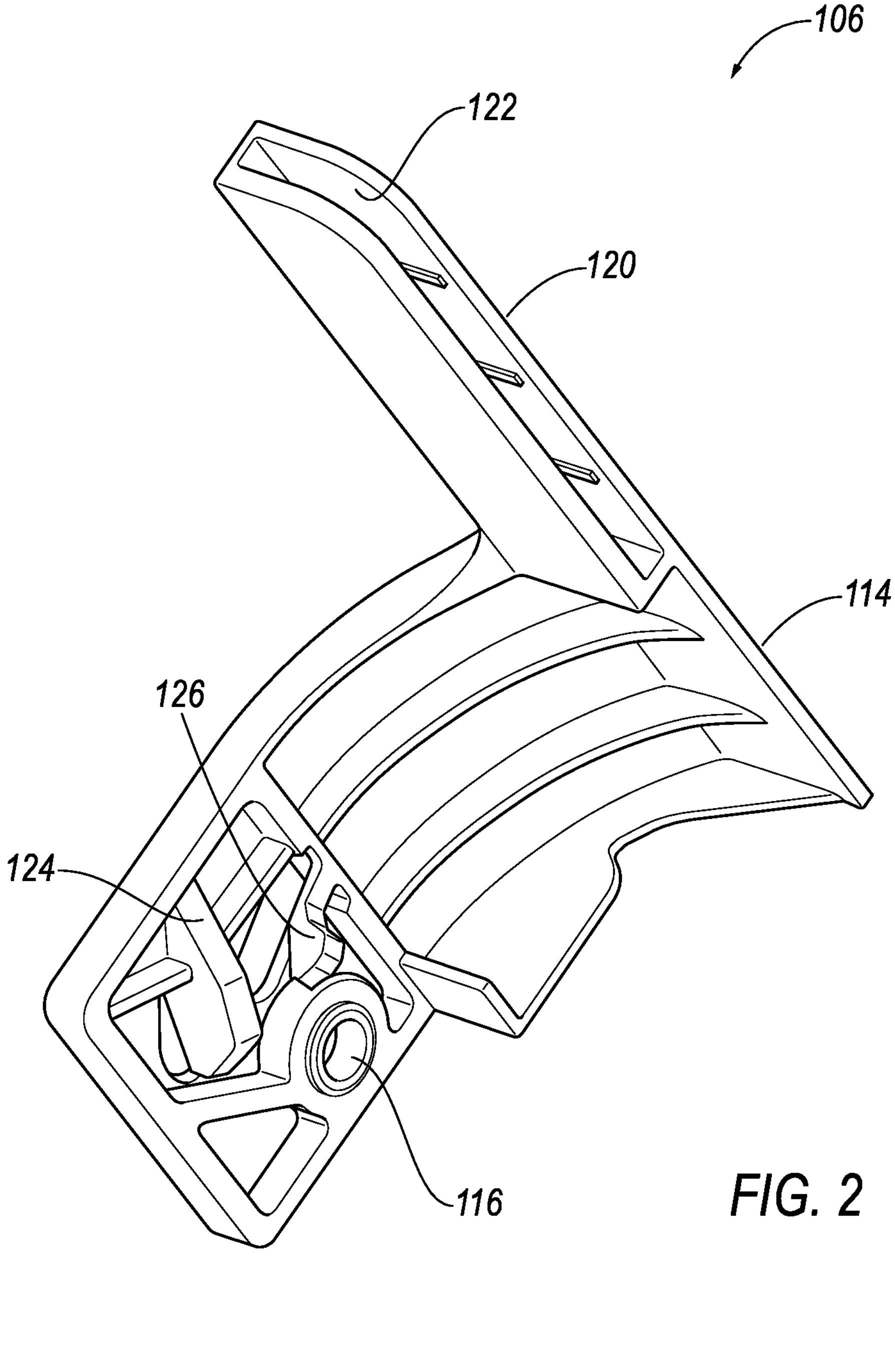
FIG. 2 is a perspective view of a left hinge of the cooking appliance, in accordance with an embodiment of the disclosure.

FIG. 2 is a perspective view of the left hinge 106 of the cooking appliance 100, in accordance with an embodiment of the disclosure. While only the left hinge 106 is shown in detail, the right hinge 108 may be a corresponding mirror image of the left hinge 106 and the top panel 102 may in general have left to right symmetry.

Figure 3:
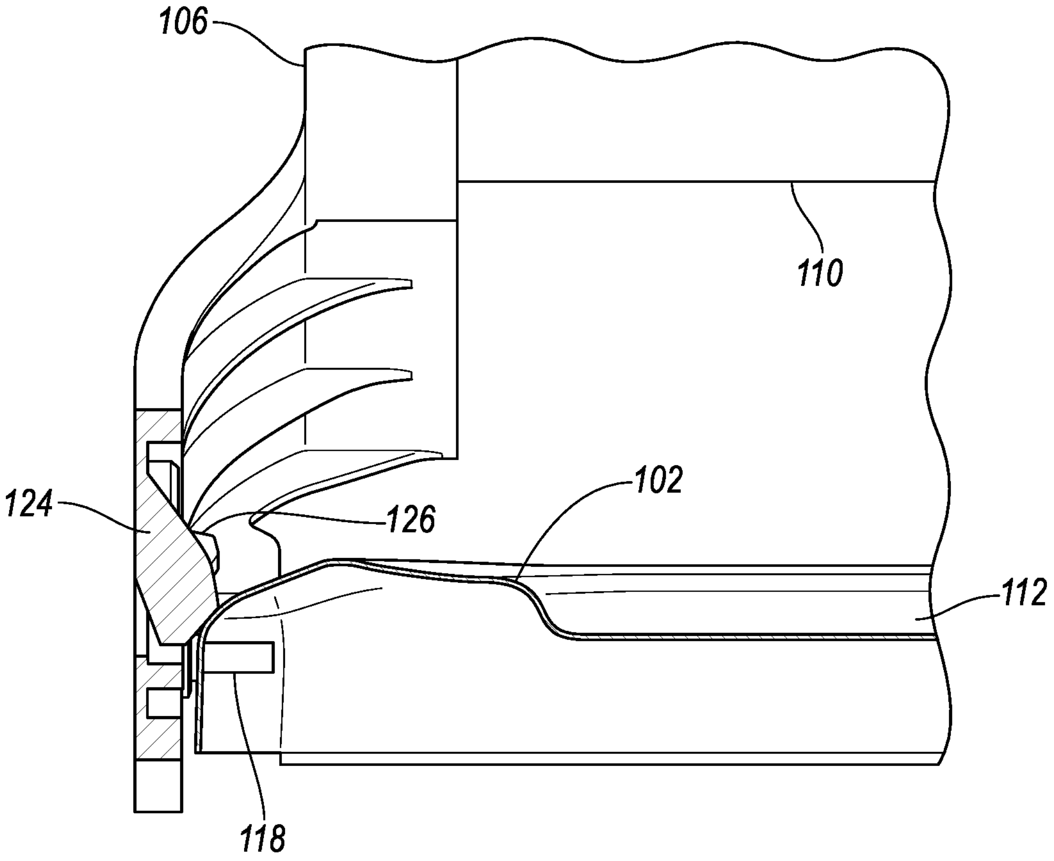
FIG. 3 is a cutaway front view of the cooking appliance and the hinge illustrating the use if the cooktop profile as a cam and a snap fit of the hinge as a follower.

The hinges 106, 108 may be composed of a polymer, such as polyethylene, polypropylene, polystyrene, nylon, and the like, and may be produced via an injection molding. Each of the hinges 106, 108 may include a generally rectangular base 114 having an aperture 116 or other mechanism at a proximal end to secure the hinges 106, 108 onto a corresponding assembly mount 118 located near the rear of the cooking appliance 100 (as best seen in FIG. 3).

The assembly mount 118 (not shown in FIG. 2) may be a pin or other form of connector with respect to which the hinges 106, 108 may rotate. The assembly mount 118 may extend laterally outward from the top panel 102 to interface with the aperture 116 of the respective hinge 106, 108. For instance, the assembly mount 118 may be a pin inserted into an opening defined by the side of the top panel 102. The assembly mount 118 may have a first portion with a first radius for insertion into the opening of the top panel 102 and a second portion with a greater radius for insertion into the respective apertures 116 of the hinges 106, 108. In another example, the assembly mount 118 may be integral to the top panel 102 and may be sized to fit into the apertures 116.

The left hinge 106 and right hinge 108 may each also include a lid support 120 extending perpendicularly from the distal end of the base 114. The lid supports 120 of the left hinge 106 and right hinge 108 may each include a longitudinal groove 122, such that when the cooking appliance 100 is assembled, the longitudinal grooves 122 face one another to allow for the appliance lid 110 to be mounted to the hinges 106, 108 of the cooking appliance 100 within the groove 122. Once assembled, the hinge assembly 104 provides for free rotational movement of the appliance lid 110 about the assembly mounts 118. However, if the appliance lid 110 is released from above a certain angle while in the open position, the lid may fall hard onto the heating elements 112. This impact may damage the appliance lid 110 and the heating elements 112, or items on the heating elements 112 such a cooking pans.

The cam-follower principle may be used to delay the fall of the appliance lid 110. That is, the contour of the top panel 102 from the top surface to the vertical flange may be used as a cam and one or more snap fit portions 124, 126 of the hinge assembly 104 may be used as a follower. This is discussed in more detail with respect to FIG. 3.

FIG. 3 is a cutaway front view of the cooktop and the hinge illustrating the use of the cooktop profile as a cam and snap fit portions 124, 126 of the hinge as a follower. In another example, the first snap fit portion 124 may form the cam and act as a counterforce on the cooktop profile. As best seen in FIG. 3, the snap fit portions 124, 126 each define a protrusion extending inwards towards the side of the top panel 102. The top panel 102 includes a corresponding side surface against which the snap fit portions 124, 126 run in a controlled motion to brake the rotational motion of the appliance lid 110 against the contour of the top panel 102. Thus, the snap fit portions 124, 126 engage the side profile of the top panel 102 to create friction of the hinge assembly 104 against the top panel 102 to slow the descent of the appliance lid 110, but still allowing the appliance lid 110 to descend. It should be noted that while two snap fit portions 124, 126 are shown in the example left hinge 106, designs with one or more than two snap fit portions 124, 126 may be utilized as well.

Accordingly, the falling of the appliance lid 110 from the raised position to the lowered position is slowed by travel of the follower along the cam defined by the top panel 102. As this approach is integral to the hinge assembly 104 and may be formed as a feature of the injection molding of the hinges 106, 108, the snap fit portions 124, 126 do not affect assembly of the cooking appliance 100 and also do not add complexity to the cooking appliance 100 to generate the soft close effect. Moreover, as the weight of the appliance lid 110 may inherently bias the snap fit portions 124, 126 against the top panel 102, no additional biasing element is required. The lid 110 may be permitted to descend onto the cooktop in order to both allow the lid to close on the cooktop without damaging the lid or cooktop, as well as give the user an opportunity to stop the lid from closing on the cooktop, should the closing of the lid be undesirable or accidental.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A soft-close lid assembly for an appliance, comprising:

a top panel of the appliance defining an appliance profile;

an appliance lid; and a hinge assembly coupled to the appliance and the appliance lid to allow the appliance lid to pivot relative to the appliance between a lowered position in which the appliance lid rests horizontally above the appliance and a raised position in which the appliance lid defines a non-horizontal plane away from the appliance allowing access to at least a portion of the appliance, wherein the hinge assembly includes one or more snap fit portions configured to engage the appliance profile of the appliance, such that the appliance is configured to operate as a cam and the one or more snap fit portions are configured to operate as a follower when in contact with the cam, and the weight of the appliance lid biases the one or more snap fit portions of the hinge against the appliance profile, thereby slowing descent of the lid from the raised position to the lowered position by travel of the follower along the cam.

2. The appliance of claim 1, wherein the hinge assembly includes a left hinge and a right hinge supporting respective sides of the appliance lid.

3. The appliance of claim 2, wherein the one or more snap fit portions include at least one snap fit portion on each of the left and right hinges.

4. The appliance of claim 2, wherein the left and right hinges are mirror images of one another.

5. The appliance of claim 2, wherein the left and right hinges are formed of an injected molded polymer.

6. The appliance of claim 1, wherein the top panel includes one or more heating elements, and the appliance lid is sized to cover the one or more heating elements in the lowered position.

7. The appliance of claim 6, wherein the appliance lid includes a glass top.

8. The appliance of claim 1, wherein the weight of the appliance lid biases the one or more snap fit portions of the hinge assembly against the appliance profile.

9. The appliance of claim 1, wherein the hinge assembly is coupled to the rear of the appliance to allow the lid to pivot relative to the rear of the appliance.

10. A soft-close apparatus for an appliance, comprising:

a hinge for coupling to an appliance and an appliance lid to allow the appliance lid to pivot relative to the appliance, wherein the hinge includes one or more snap fit portions configured to engage an appliance profile of the appliance, such that the appliance is configured to operate as a cam and the one or more snap fit portions are configured to operate as a follower when in contact with the cam, thereby slowing the descent of the lid by travel of the follower along the cam, wherein the weight of the appliance lid biases the one or more snap fit portions of the hinge against the appliance profile.

11. The soft-close apparatus of claim 10, wherein the hinge allows the appliance lid to pivot relative to the appliance between a lowered position in which the appliance lid rests horizontally above the appliance and a raised position in which the appliance lid defines a non-horizontal plane away from the appliance allowing access to at least a portion of the appliance.

12. The soft-close apparatus of claim 10, wherein each of the snap fit portions defines a protrusion extending towards a side of a top panel of the appliance, the top panel defining the appliance profile against which the snap fit portions run in a controlled motion to brake rotational motion of the appliance lid against the profile of the top panel.

13. The soft-close apparatus of claim 12, wherein the one or more snap fit portions include a plurality of snap fit portions.

14. The soft-close apparatus of claim 11, further comprising the appliance lid, wherein the appliance lid is sized to cover one or more heating elements when in the lowered position.

15. The soft-close apparatus of claim 14, wherein the appliance lid includes a glass top.

16. A soft-close apparatus for an appliance, comprising:

an appliance lid; and a hinge for coupling to an appliance and an appliance lid to allow the appliance lid to pivot relative to the appliance, wherein the appliance lid is sized to cover one or more heating elements when in the lowered position, wherein the hinge allows the appliance lid to pivot relative to the appliance between a lowered position in which the appliance lid rests horizontally above the appliance and a raised position in which the appliance lid defines a non-horizontal plane away from the appliance allowing access to at least a portion of the appliance, wherein the hinge includes one or more snap fit portions configured to engage an appliance profile of the appliance, such that the appliance is configured to operate as a cam and the one or more snap fit portions are configured to operate as a follower when in contact with the cam, thereby slowing the descent of the lid by travel of the follower along the cam, and wherein the weight of the appliance lid biases the one or more snap fit portions of the hinge against the appliance profile.

17. The soft-close apparatus of claim 10, wherein the hinge is formed of an injected molded polymer.

18. The soft-close apparatus of claim 10, wherein the hinge is coupled to the rear of the appliance to allow the lid to pivot relative to the rear of the appliance.

19. The soft-close apparatus of claim 10, wherein the hinge defines an aperture configured to receive a pin about which the hinge provides the appliance lid to pivot relative to the appliance.

20. The soft-close apparatus of claim 10, wherein the hinge further comprises a lid support having a longitudinal groove for mounting of the appliance lid.

* * * * *